United States Patent [19]

Buljan

[11] Patent Number: 4,492,765

[45] Date of Patent: Jan. 8, 1985

[54] SI$_3$N$_4$ CERAMIC ARTICLES HAVING LOWER DENSITY OUTER LAYER, AND METHOD

[75] Inventor: Sergej-Tomislav Buljan, Acton, Mass.

[73] Assignee: GTE Products Corporation, Stamford, Conn.

[21] Appl. No.: 178,485

[22] Filed: Aug. 15, 1980

[51] Int. Cl.$^3$ ............................................. C04B 35/58
[52] U.S. Cl. ......................................... 501/97; 423/344; 428/218; 428/446; 428/698
[58] Field of Search ............... 423/344; 428/218, 446, 428/698; 264/125; 501/97

[56] References Cited

U.S. PATENT DOCUMENTS

| | | | |
|---|---|---|---|
| 3,824,120 | 7/1974 | Davidge et al. | 428/446 |
| 3,885,294 | 5/1975 | Chaundy et al. | 423/344 |
| 3,887,411 | 6/1975 | Goodgear et al. | 423/344 |
| 3,903,230 | 9/1975 | Kamigaito et al. | 264/125 |
| 3,911,188 | 10/1975 | Torti, Jr. et al. | 428/218 |
| 3,992,497 | 11/1976 | Terwilliger et al. | 501/97 |
| 4,061,816 | 12/1977 | Kitamura | 428/218 |
| 4,073,845 | 2/1978 | Buljan et al. | 264/65 |
| 4,178,415 | 12/1979 | Ovshinsky et al. | 428/446 |
| 4,209,474 | 6/1980 | Prochazka | 264/125 |
| 4,216,017 | 8/1980 | Carcey | 264/125 |
| 4,280,850 | 7/1981 | Smith et al. | 156/73.5 |

*Primary Examiner*—William R. Dixon, Jr.
*Attorney, Agent, or Firm*—James Theodosopoulos

[57] ABSTRACT

Monolithic Si$_3$N$_4$ ceramic bodies having a lower density outer layer are produced by a one-step sintering in an ambient atmosphere of water vapor and a nonreactive diluent gas, and are useful, for example, as abradable seal and impact resistant structural elements.

2 Claims, 1 Drawing Figure

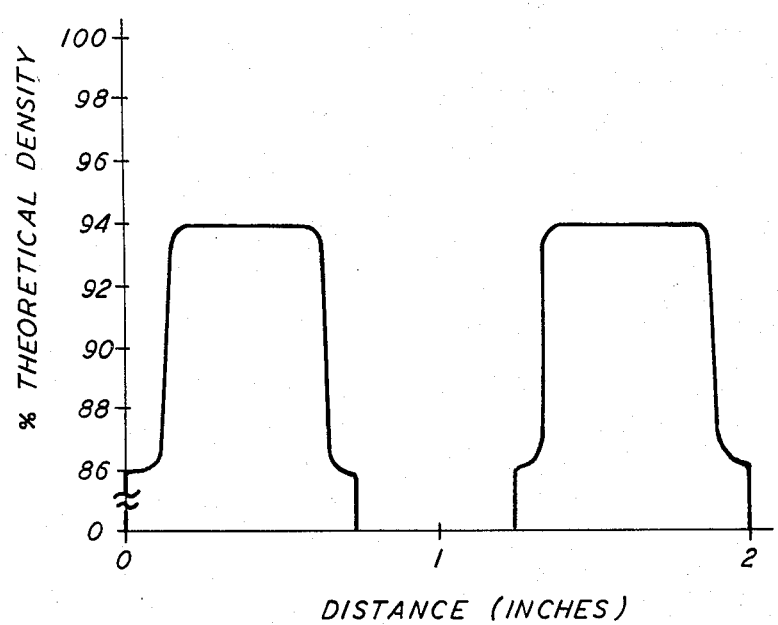

$Si_3N_4$ CERAMIC ARTICLES HAVING LOWER DENSITY OUTER LAYER, AND METHOD

BACKGROUND

This invention relates to $Si_3N_4$ ceramic articles, and more particularly relates to such articles in monolithic form having a lower density outer layer, and to a method for producing them.

Current interest in $Si_3N_4$ ceramics reflects a recognition that their good-to-excellent high temperature mechanical strength, thermal shock resistance, and chemical inertness make these materials excellent candidates for structural applications at temperatures above those tolerated by superalloy materials.

An outstanding example of such a structural application is the gas turbine engine, wherein $Si_3N_4$ is being considered for rotor and stator vanes, shrouds and sealing rings.

Due to very stringent tolerance requirements between the rotor vanes and the surrounding sealing ring, a seal with an abradable inner layer is being considered, wherein during engine start-up the rotor vanes would seat themselves against the seal by thermal expansion into the abradable layer.

Techniques are known for the production of high density (and thus high strength) $Si_3N_4$ bodies by hot pressing and by pressureless sintering. U.S. Pat. No. 4,073,845, issued to Buljan et al. on Feb. 14, 1978, describes the pressureless sintering of partly crystalline, partly amorphous starting material to obtain sintered densities previously obtained only by hot pressing.

$Si_3N_4$ bodies having density differences between inner and outer portions may be produced by seperately forming elements of such different densities, and bonding the elements into a composite structure. For example, U.S. Pat. No. 3,885,294, issued May 27, 1975, forms a first article portion by nitridation, and then bonds a higher density layer to it by hot pressing. Such techniques tend to be complex and time-consuming.

Another technique for achieving such different densities is to carry out nitridation of silicon powder in-situ on a $Si_3N_4$ substrate, as reported by Brennan et al., Government Contract Report NAS3-19731, Oct. 25, 1977.

SUMMARY OF THE INVENTION

In accordance with the invention, monolithic bodies of $Si_3N_4$ ceramic having a lower density outer layer are produced in a single sintering step by sintering green compacts in an ambient atmosphere of water vapor and an optional non-reactive diluent gas. The final product has a layer of lower density $Si_3N_4$ on the exposed surfaces of the body, the thickness of which can be varied by varying the time of exposure to the ambient atmosphere, the dewpoint of the ambient atmosphere, (and the overpressure of the ambient when sintering is carried out in a closed system). The final density of the layer will depend upon initial density of the green compact, dewpoint and exposure time.

Resulting articles are useful in a variety of structural applications, but may find special application as an abradable seal for gas turbine engines, or as an impact resistant material.

BRIEF DESCRIPTION OF THE DRAWING

The FIGURE is a density gradient curve representing a cross-section of a $Si_3N_4$ body produced in accordance with the invention.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

The $Si_3N_4$ starting material may be amorphous material, amorphous material which has been partly crystallized by heat treatment, or may be a mixture of substantially completely amorphous material and substantially completely crystalline material. U.S. patent application Ser. No. 625,330, filed Oct. 23, 1975, assigned to the present assignee and now abandoned, describes the formation of a $Si_3N_4$ powder of high purity, and fine particle size by the vapor phase reaction of $SiCl_4$ and $NH_3$.

To prepare powder compositions for consolidation, $Si_3N_4$ powders are typically mixed with a densification aid by ball milling. The milling may be done wet and/or dry. If milling is not performed using $Si_3N_4$ media, milling could result in contamination of the powder mixture by abrasion of the milling container and milling media surfaces. For example, powders milled with $Al_2O_3$ media show a total of up to 4 weight percent $Al_2O_3$ added to the batch during milling.

Bodies may be prepared by pressureless sintering preceded by a suitable consolidation step such as dry pressing, isostatic pressing, extruding, slip casting, injection molding, etc. See U.S. Pat. No. 4,073,845 for a general procedure for pressureless sintering of $Si_3N_4$ bodies and copending U.S. Pat. No. 4,280,850, filed for a general procedure for hot pressing.

While the invention applies to bodies containing one or more densifying additives up to about 25 weight percent, (known additives including for example MgO, CrN, $Y_2O_3$, $La_2O_3$, $ZrO_2$, ZrN, $HfO_2$, $CeO_2$, $Al_2O_3$ and $SiO_2$), it is preferred to employ MgO in the amount of up to about 5 weight percent or $Y_2O_3$ up to about 20 weight percent.

After formation into a green compact of the final desired shape, the body is pressureless sintered in an ambient atmosphere of water vapor and an optional non-reactive diluent gas. The dewpoint of the ambient, defined herein as the temperature at which condensation of water vapor takes place, and may range preferably between $-75°$ C. and $-20°$ C.

Suitable diluent gases are hydrogen, and any of the Noble gases (He, Ne, Ar, K, Xe, Rn). Oxidizing or carburizing gases such as $O_2$, CO, ($CO_2$?) are to be avoided. Also to be avoided is nitrogen, the presence of which will favor formulation of $Si_2N_2O$. Generally, carrying out sintering in an open system of flowing hydrogen at a temperature of from 1500° C. to 1825° C., will at essentially atmospheric pressure result in sufficient vapor being present (about 1 to 1000 parts per million of water vapor in the diluent gas) to correspond to a dewpoint of from about $-75°$ C. to $-50°$ C.

The basic mechanism for the obtaining of lower density in the outer layers of the body is thought to be a two step decomposition of $Si_3N_4$ caused by the presence of the water vapor according to the following reactions:

$$Si_3N_4 \rightarrow 3Si + 2N_2 \quad (1)$$

$$3Si + 3H_2O \rightarrow 3SiO + 3H_2 \quad (2)$$

Any free Si present would, of course, be removed by reaction (2).

By way of example, $Si_3N_4$ powder containing about 5 weight percent MgO as a densifying additive was formed into a green compact of a two inch diameter ring pressed to 72 percent of its theoretical density. The compact was sintered at 1550° C. for two hours in an open system in a hydrogen-water vapor ambient atmosphere having a dewpoint of −50° C. The Figure, which is a plot of density (as percent of theoretical) versus distance from one surface of a cross-section of the sintered ring, shows that a lower density layer of about ⅛ inch thickness was formed on both exposed surfaces of the ring. The density of this outer layer was about 86%, while the density of the interior was about 94%. These adjacent layers exhibited a coherent interface, having a relatively smooth density gradient in the interfacial region, as may be seen from the knee portions of the curve of density gradient of the Figure.

Some of the advantages of such a dual density material are as follows:

1. Its lower density surface can be utilized in gas turbine engine applications to obtain an abradable surface and therefore a better seal by minimizing the gap between rotor blades and the abradable surface.

2. It's lower density surface can be utilized to increase impact resistance by crushing to dissipate the energy of impact, thus raising the materials' impact strength.

As will be appreciated, one or more of all or a portion of the exposed surfaces of the green compact may be masked during sintering to protect such surfaces from the effect of the ambient atmosphere. Such masking may be desirable, for example, where an abradable seal or impact resistant body requires only one exposed surface of lower density.

While there has been shown and described what are at present considered the preferred embodiments of the invention, it will be obvious to those skilled in the art that various changes and modifications may be made therein without departing from the scope of the invention as defined by the appended claims.

INDUSTRIAL APPLICABILITY $Si_3N_4$ ceramic articles having an outer layer of lower density are useful in specialized structural applications, such as abradable seals for gas turbine engines and impact resistant surfaces.

I claim:

1. A dense monolithic $Si_3N_4$ ceramic body, characterized in that at least a portion of the body has an outer layer exhibiting a lower density than the interior of the body.

2. The body of claim 1 containing up to 25 weight percent of a densifying additive selected from the group consisting of MgO, CrN, $Y_2O_3$, $La_2O_3$, $ZrO_2$, ZrN, $HfO_2$, $CeO_2$, $Al_2O_3$ and $SiO_2$.

* * * * *